(12) United States Patent
Chen

(10) Patent No.: US 7,029,074 B2
(45) Date of Patent: Apr. 18, 2006

(54) WHEEL RIM WITH ANCHOR MEMBERS CONNECTED TO SPOKES

(75) Inventor: Chao-Ying Chen, Tainan Hsien (TW)

(73) Assignee: Alex Global Technology, Inc., Tainan Hsien (TW)

( * ) Notice: Subject to any disclaimer, the term of this patent is extended or adjusted under 35 U.S.C. 154(b) by 176 days.

(21) Appl. No.: 10/832,511

(22) Filed: Apr. 27, 2004

(65) Prior Publication Data

US 2005/0236885 A1    Oct. 27, 2005

(51) Int. Cl.
*B60B 1/14* (2006.01)
(52) U.S. Cl. .................... 301/95.101; 301/95.104; 301/58
(58) Field of Classification Search ............ 301/55, 301/58, 95.101, 95.104, 95.106, 95.107
See application file for complete search history.

(56) References Cited

U.S. PATENT DOCUMENTS 6,145,937 A * 11/2000 Chen ........................... 301/58
6,186,598 B1 * 2/2001 Chen ........................... 301/58
6,293,629 B1 * 9/2001 Chen ........................... 301/58
6,715,844 B1 * 4/2004 Dietrich ....................... 301/58
2005/0156461 A1 * 7/2005 Chiang et al. ................ 301/58

* cited by examiner

*Primary Examiner*—Russell D. Stormer
(74) *Attorney, Agent, or Firm*—The Webb Law Firm

(57) ABSTRACT

A wheel rim includes a rim body and a plurality of anchor members. The rim body includes annular left and right side walls, an annular connecting wall interconnecting the left and right side walls, and annular left and right confining ribs extending respectively from the radial inner ends of the left and right side walls toward each other to define a mounting space among the left and right side walls, the connecting wall, and the confining ribs. The confining ribs define an opening communicated with the mounting space. The anchor members are disposed fixedly within the mounting space. Each of the anchor members has a bottom wall abutting against the confining ribs and having a first mounting hole which is adapted to permit extension of a respective one of the spoke units therethrough.

10 Claims, 11 Drawing Sheets

WHEEL RIM WITH ANCHOR MEMBERS CONNECTED TO SPOKES

BACKGROUND OF THE INVENTION

1. Field of the Invention

This invention relates to a wheel rim, and more particularly to a wheel rim for connection with a tire that does not have an inner tire body.

2. Description of the Related Art

Referring to FIG. 1, a conventional wheel rim 1 interconnects a tire 11 and a plurality of spokes 12 (only one is shown). The tire 11 does not have an inner tire body. Each of the spokes 12 is connected to a hub (not shown), and has an enlarged end 121, a radial spoke portion 122 extending along a radial direction of the hub (not shown), and an axial spoke portion 123 extending along an axial direction of the hub (not shown).

The wheel rim 1 includes a rim body 13 and a plurality of anchor members 14. The rim body 13 includes a pair of annular left and right side walls 131, each of which has a radial outer end 132 and a radial inner end 133. The rim body 13 further includes an annular connecting wall 134 interconnecting and disposed between the left and right side walls 131 and adjacent to the radial outer ends 132 of the left and right side walls 131. Each of the left and right side walls 131 is formed with a plurality of mounting holes 136 therethrough. No hole is formed in the connecting wall 134 so as to prevent leakage of air from a space between the tire 11 and the connecting wall 134.

Each of the anchor members 14 includes a pair of left and right side walls 141, one of which is formed with a hole 142 aligned with the corresponding mounting hole 136 in the rim body 13. The axial spoke portion 123 of each of the spokes 12 extends through the corresponding mounting hole 136 in the rim body 13 and the hole 142 in the corresponding anchor member 14. The enlarged end 121 of each of the spokes 12 abuts against an inner surface of a corresponding one of the left and right side walls 141 of the anchor members 14. The aforesaid conventional wheel rim 1 is disadvantageous in that common straight spokes cannot be mounted thereon.

SUMMARY OF THE INVENTION

The object of this invention is to provide a wheel rim that includes a plurality of anchor members which can be connected with straight spokes.

According to this invention, a wheel rim is adapted for connection with a tire and a plurality of spoke units. The wheel rim comprises a rim body and a plurality of anchor members. The rim body includes a pair of annular left and right side walls each having a radial inner end, an annular connecting wall interconnecting and disposed between the left and right side walls, and a pair of annular left and right confining ribs extending respectively from the radial inner ends of the left and right side walls toward each other to define a mounting space among the left and right side walls, the connecting wall, and the confining ribs. The confining ribs define cooperatively an opening that is formed therebetween and that is communicated with the mounting space. A plurality of anchor members are disposed fixedly within the mounting space. Each of the anchor members has a bottom wall that abuts against the confining ribs and that has a first mounting hole which is adapted to permit extension of a respective one of the spoke units therethrough.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
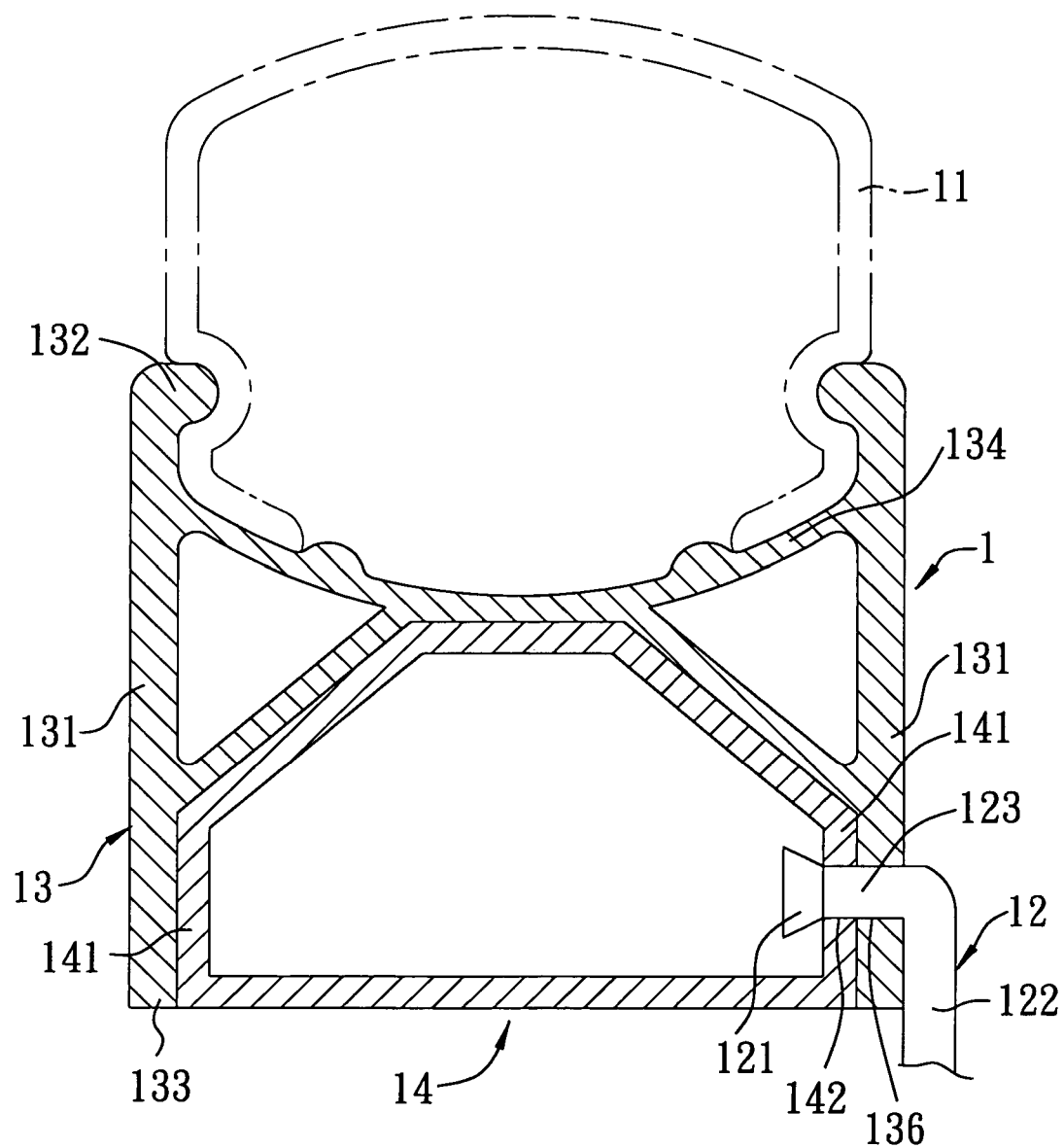
FIG. 1 is a sectional view of a conventional wheel rim.
Figure 2:
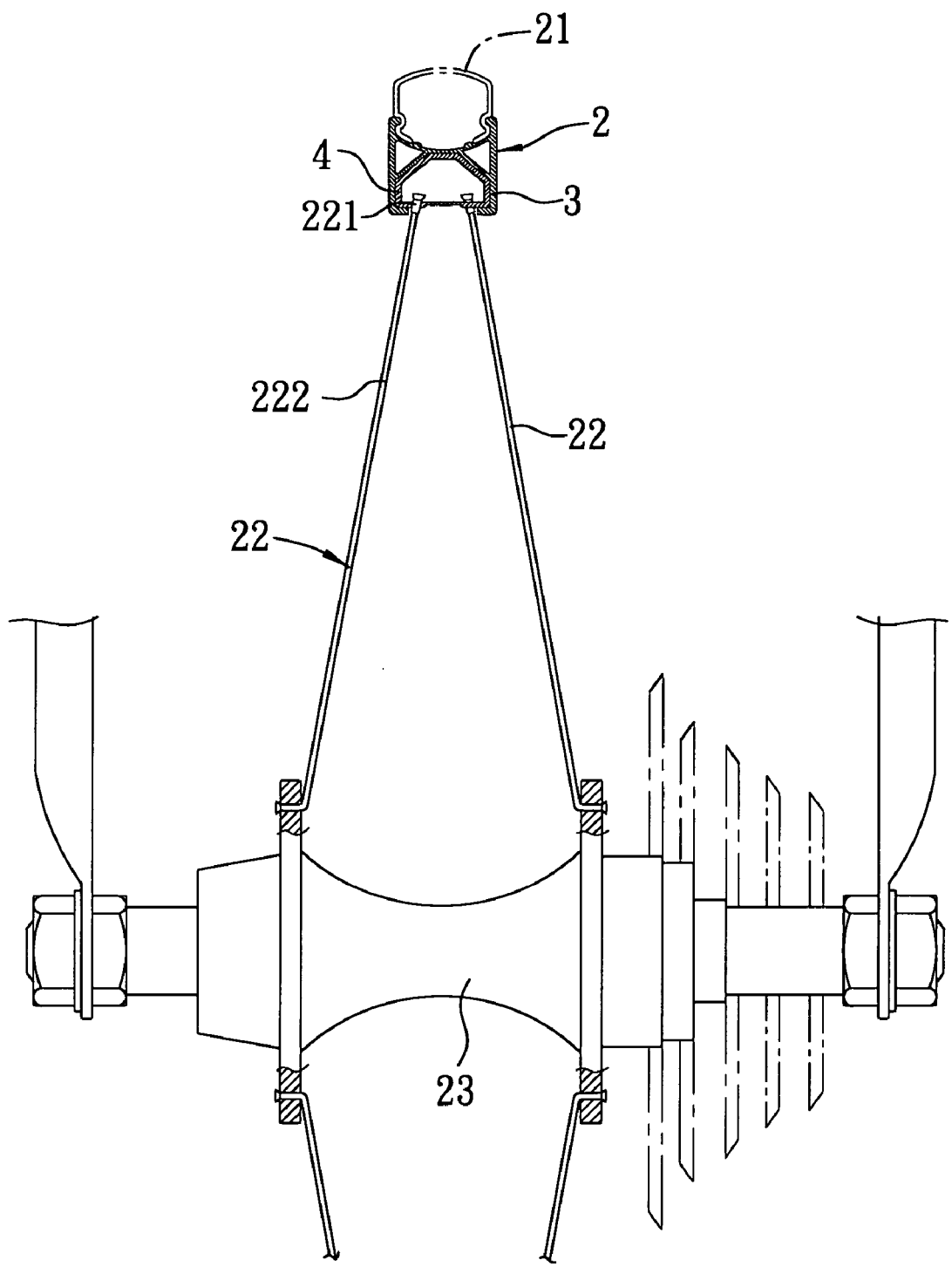
FIG. 2 is a schematic view illustrating how the first preferred embodiment of a wheel rim according to this invention is connected to a tire and a plurality of spoke units.
Figure 3:
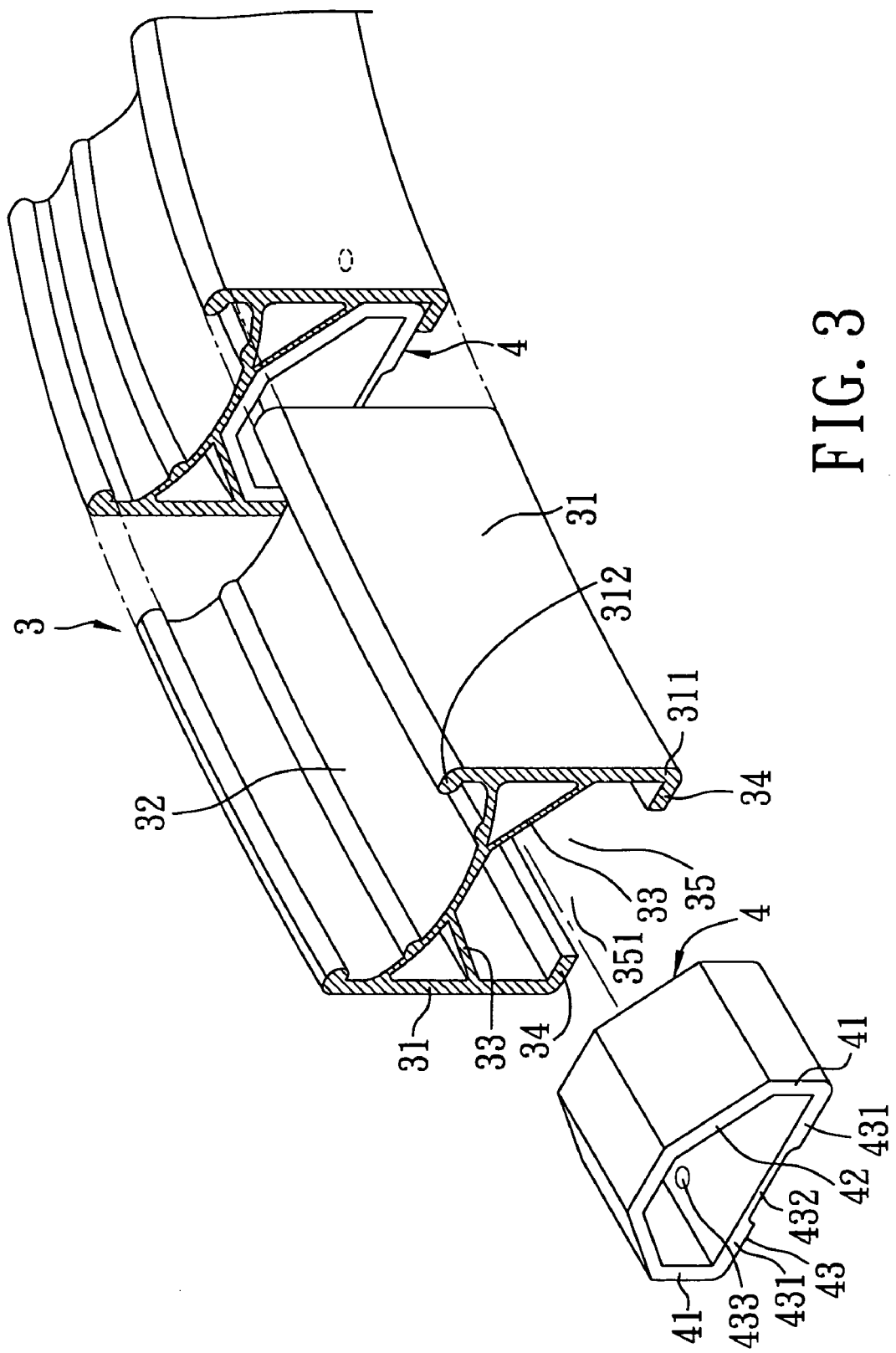
FIG. 3 is a fragmentary, partly sectional, exploded perspective view of the first preferred embodiment.
Figure 4:
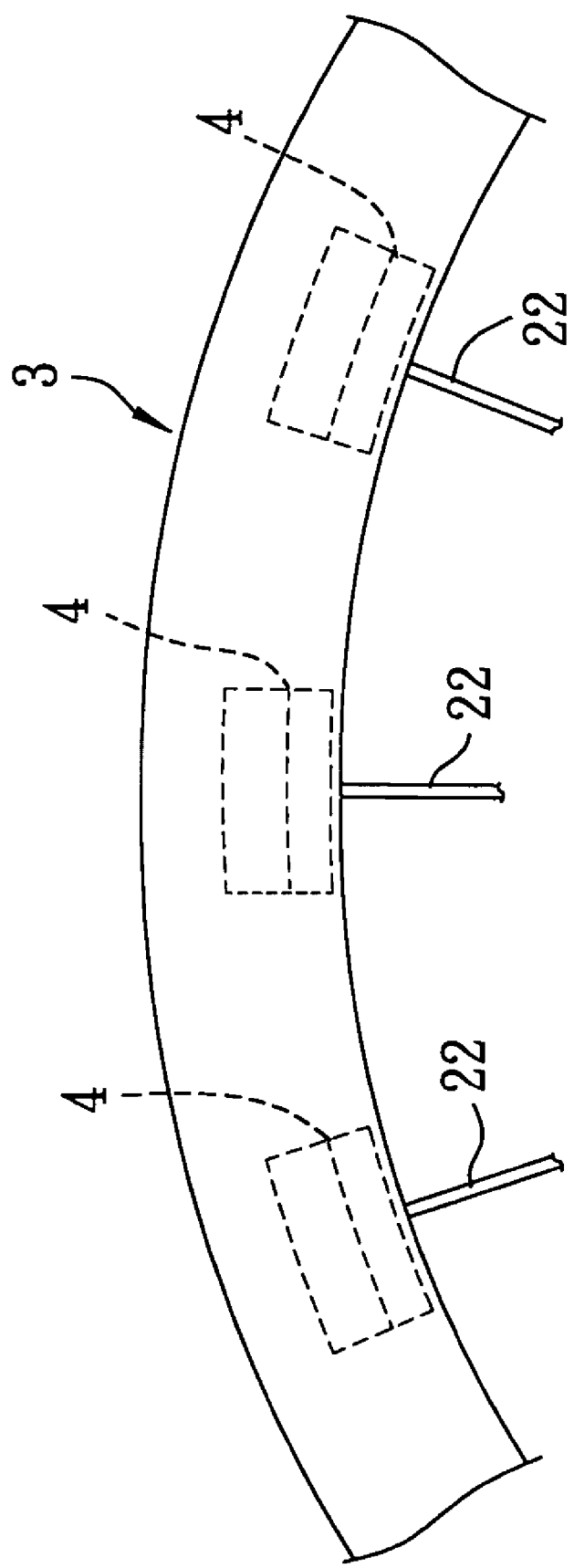
FIG. 4 is a fragmentary side view of the first preferred embodiment.
Figure 5:
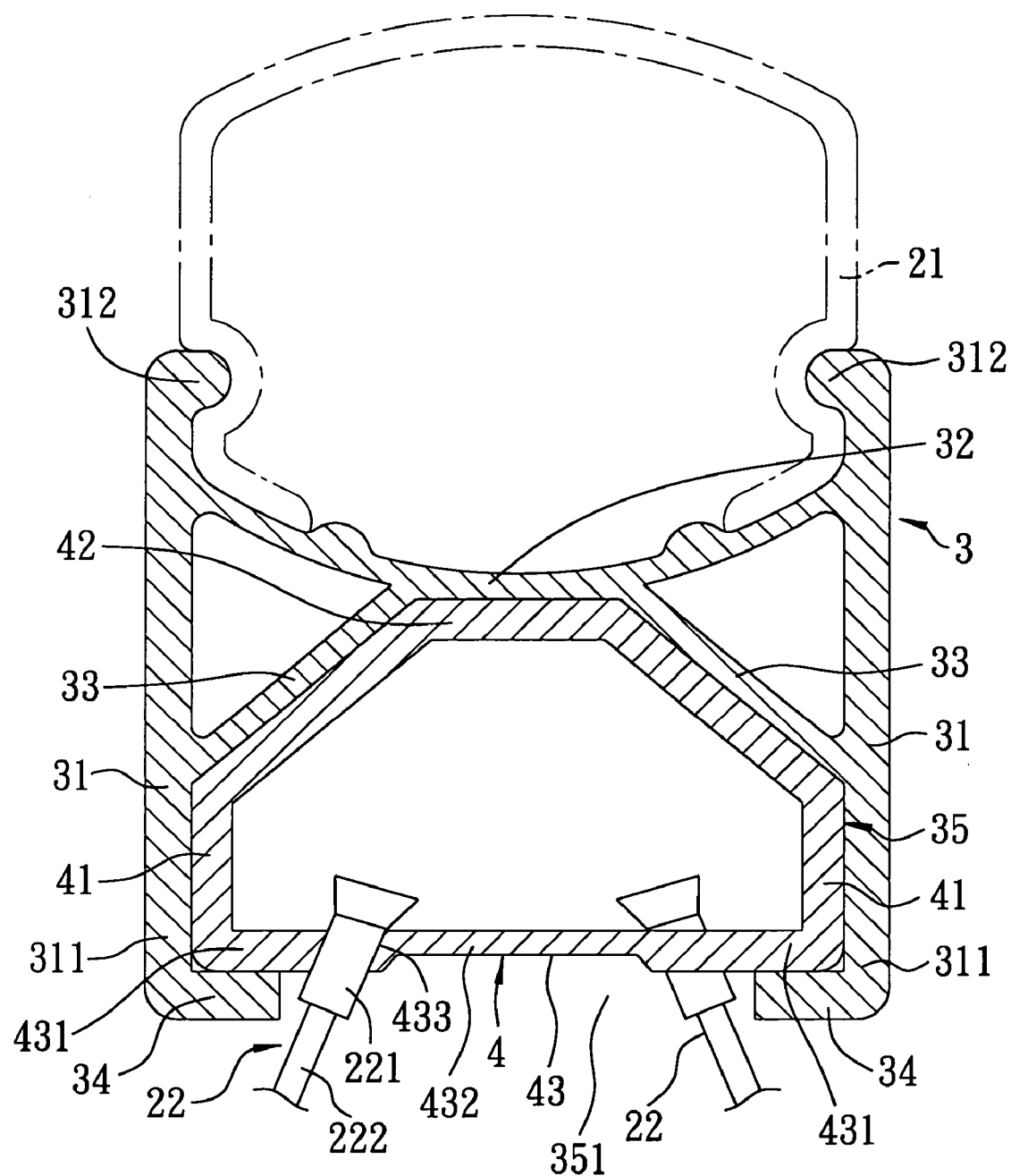
FIG. 5 is a sectional view of the first preferred embodiment.

Before the present invention is described in greater detail in connection with the preferred embodiments, it should be noted that similar elements and structures are designated by like reference numerals throughout the entire disclosure.

Referring to FIGS. 2, 3, 4, and 5, the first preferred embodiment of a wheel rim 2 according to this invention supports a tire 21, and is connected to a hub 23 by a plurality of spoke units 22. Each of the spoke units 22 includes a mounting head 221 and a straight spoke body 222 that has an externally threaded end engaging an internally threaded end of the mounting head 221. The wheel rim 2 includes a rim body 3 and a plurality of equidistant anchor members 4 that are connected respectively to the spoke units 22.

The rim body 3 includes a pair of annular left and right side walls 31, an annular connecting wall 32 interconnecting and disposed between the left and right side walls 31, and a pair of inclined left and right anchor-engaging walls 33 that have radial inner ends formed respectively and integrally with the left and right side walls 31, and adjacent radial outer ends formed integrally with the connecting wall 32. Each of the left and right side walls 31 has a radial inner end 311 and a radial outer end 312. The tire 21 is disposed among the connecting wall 32 and the radial outer ends 312 of the left and right side walls 31. The rim body 3 further includes a pair of annular left and right confining ribs 34 that extend respectively from the radial inner ends 311 of the left and right side walls 31 toward each other to define a mounting space 35 among the left and right side walls 31, the connecting wall 32, and the confining ribs 34. The confining ribs 34 define cooperatively an opening 351 that is formed therebetween and that is communicated with the mounting space 35.

The anchor members 4 are disposed fixedly within the mounting space 35 by, for example, adhesive, solder, or rivets. Each of the anchor members 4 is unitary, and includes a pair of left and right side walls 41 abutting respectively against the left and right side walls 31 of the rim body 3, a top wall 42 interconnecting radial outer ends of the left and right side walls 41 and abutting against the connecting wall 32 and the anchor-engaging walls 33, and a bottom wall 43 interconnecting radial inner ends of the left and right side walls 41 and abutting against the confining ribs 34. In each of the anchor members 4, the bottom wall 43 has a pair of thick left and right side wall portions 431, a thin middle wall portion 432 interconnecting and disposed between the thick left and right side wall portions 431, and an inclined first mounting hole 433 formed through one of the thick left and right side wall portions 431. The mounting heads 221 of the spoke units 22 extend respectively through the first mounting holes 433 in the bottom walls 43 of the anchor members 4, and have enlarged radial outer ends that can prevent removal of the spoke units 22 from the anchor members 4. Because no hole is formed in the connecting wall 32 of the rim body 3, the connecting wall 32 can cooperate with the tire 21 to define a sealed air chamber. The bottom wall 43 of each of the anchor members 4 has a portion exposed within the opening 351 in the rim body 3. As such, the bottom walls 43 of the anchor members 4 can be designed to have different colors so as to provide an ornamental effect to the wheel rim 1.

Figure 6:
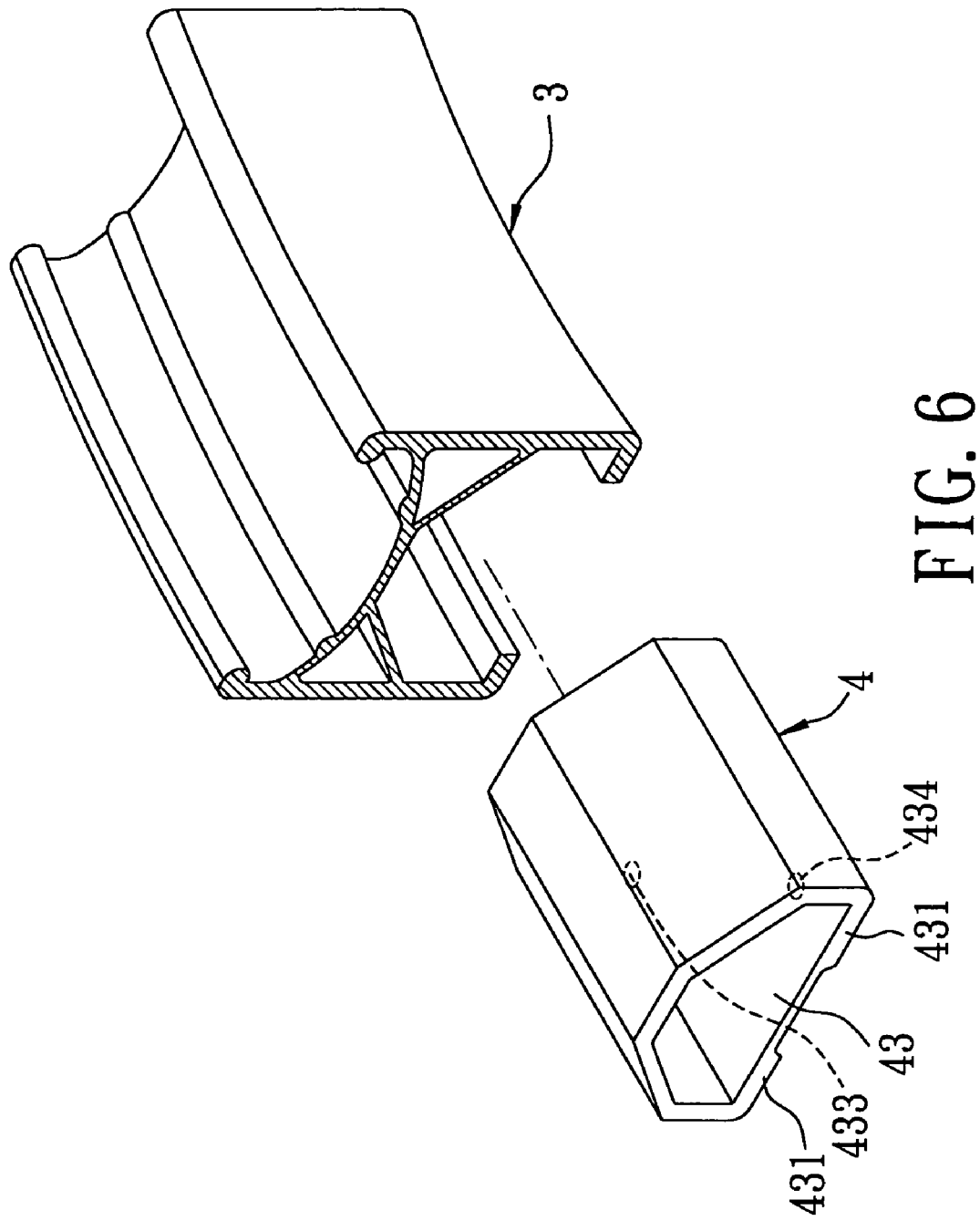
FIG. 6 is a fragmentary, partly sectional, exploded perspective view of the second preferred embodiment of a wheel rim according to this invention.
Figure 7:
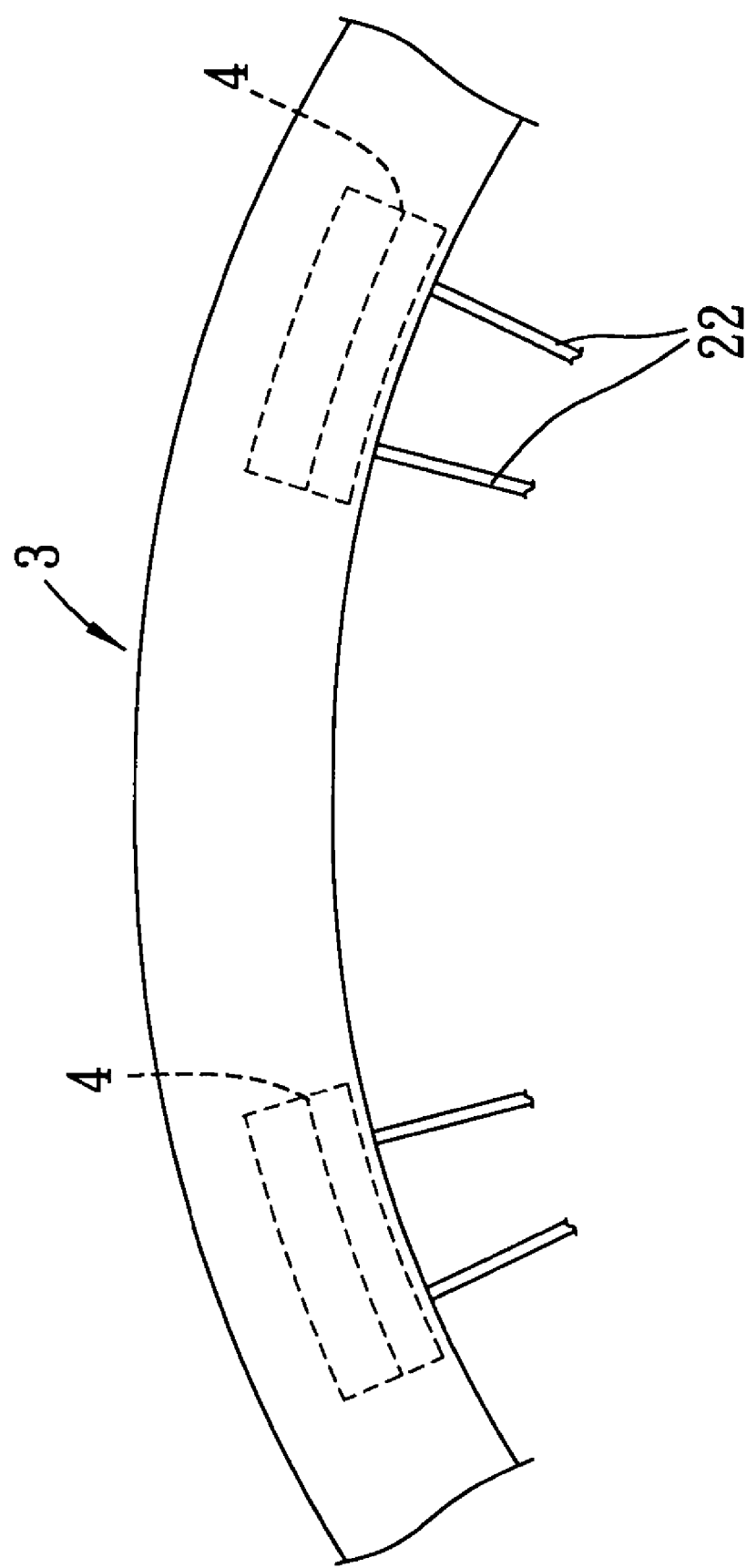
FIG. 7 is a fragmentary side view of the second preferred embodiment.

Referring to FIGS. 6 and 7, the second preferred embodiment of a wheel rim 2 is shown to also include a rim body 3 and a plurality of anchor members 4 (only one is shown in FIG. 6). Unlike the first preferred embodiment, the lengths of the anchor members 4 are increased. The bottom wall 43 of each of the anchor members 4 further has a second mounting hole 434. In each of the anchor members 4, the first and second mounting holes 433, 434 are disposed respectively at the thick left and right side wall portions 431 of the bottom wall 43. Because each of the anchor members 4 is connected to two spoke units 22, the number of the anchor members 4 can be reduced. Each of the anchor members 4 may further have a third mounting hole (not shown) so as to further reduce the number of the anchor members 4 in the wheel rim 2 of this invention.

Figure 8:
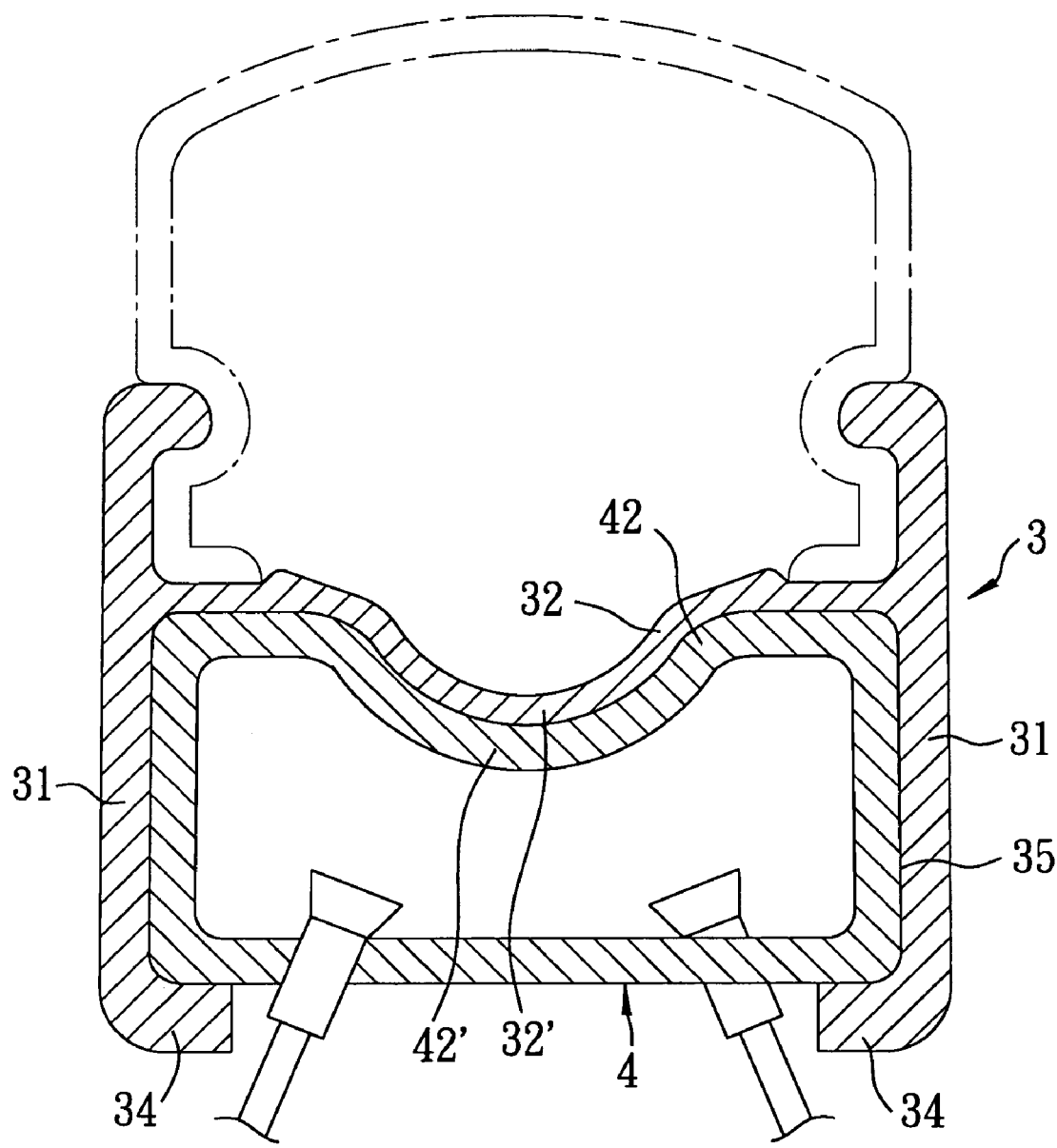
FIG. 8 is a sectional view of the third preferred embodiment of a wheel rim according to this invention.

FIG. 8 shows the third preferred embodiment of a wheel rim 2 according to this invention, which is similar to the first preferred embodiment in construction. Unlike the first preferred embodiment, each of the connecting wall 32 of the rim body 3 and the top walls 42 of the anchor members 4 has a radially and inwardly concaved middle portion 32', 42'. The rim body 3 does not include the anchor-engaging walls 33 (see FIG. 3). The bottom wall 43 of each of the anchor members 4 has a uniform thickness.

Figure 9:
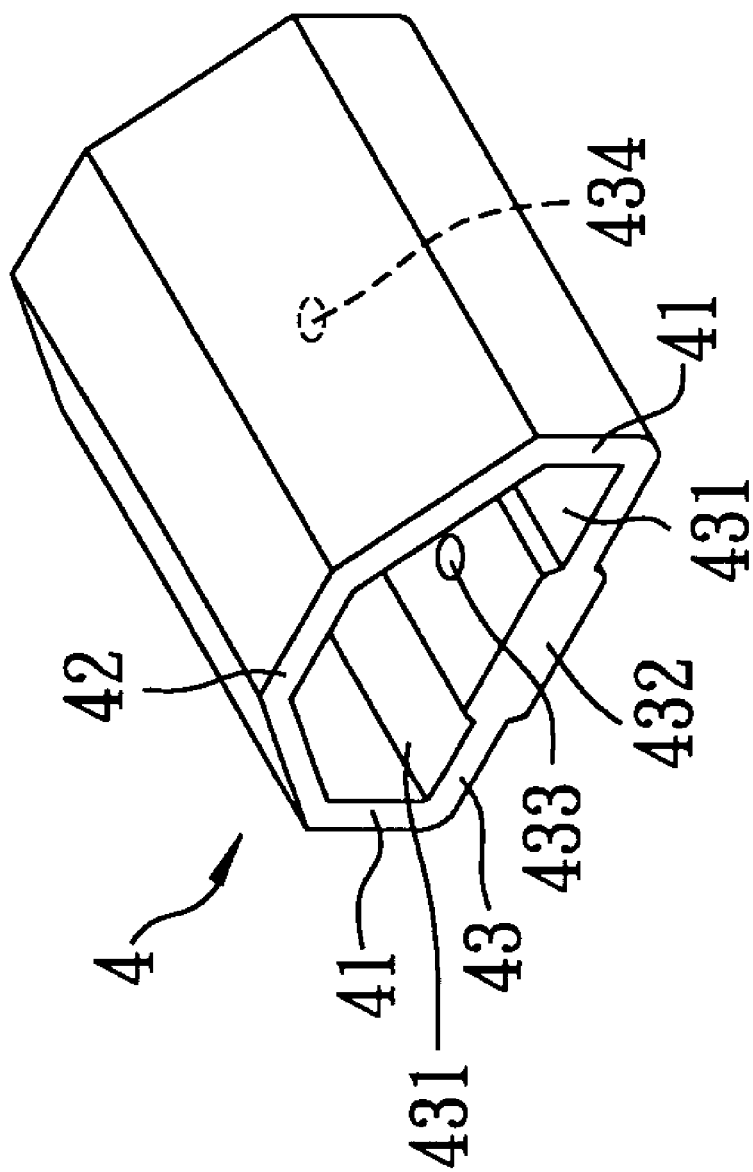
FIG. 9 is a perspective view of an anchor member of the fourth preferred embodiment of a wheel rim according to this invention.

FIG. 9 shows the fourth preferred embodiment of a wheel rim 2 according to this invention. Unlike the second preferred embodiment, the bottom wall 43 of each of the anchor members 4 has a pair of thin left and right side wall portions 431 and a thick middle wall portion 432 thicker than the thin left and right side wall portions 431. In each of the anchor members 4, the first and second mounting holes 433, 434 are disposed at the thick middle wall portion 432. The first and second mounting holes 433, 434 are disposed in a plane.

Figure 10:
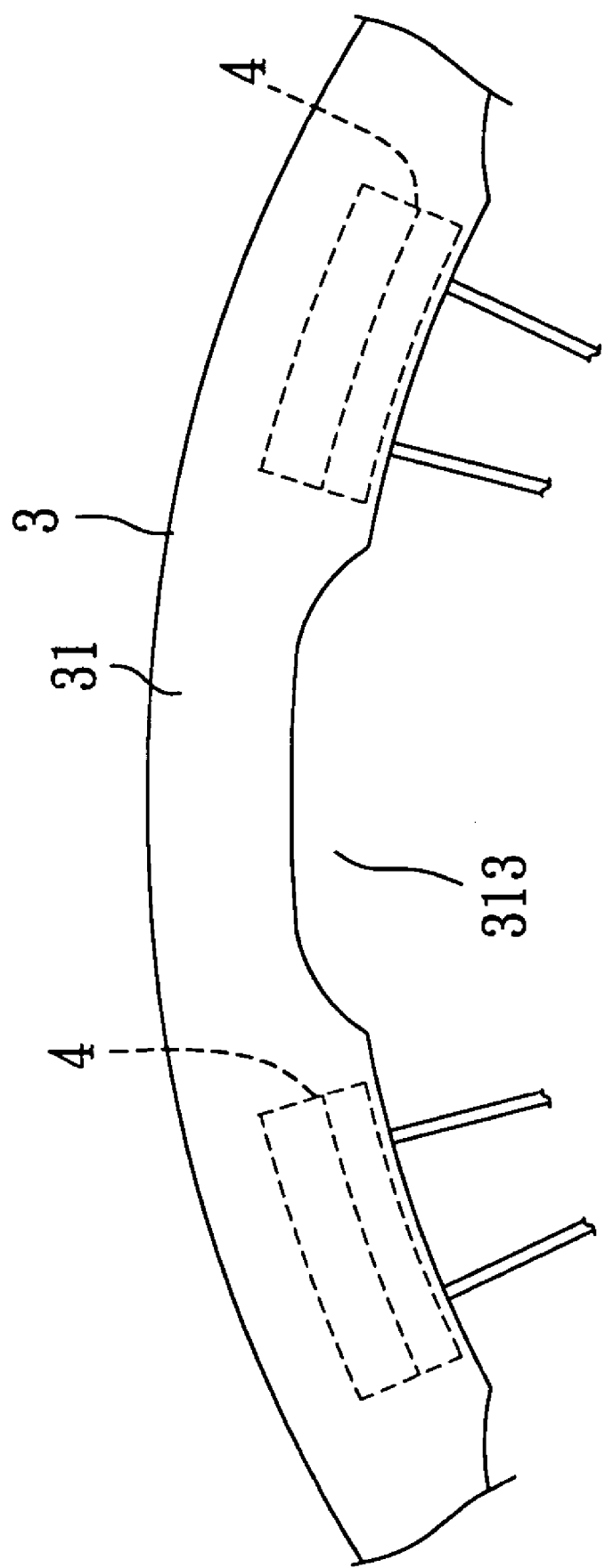
FIG. 10 is a fragmentary side view of the fifth preferred embodiment of a wheel rim according to this invention.

FIG. 10 shows modified left and right side walls 31 of the rim body 3, each of which has an inner periphery that is formed with a plurality of equidistant notches 313. As such, the total weight of the rim body 3 can be reduced.

Figure 11:
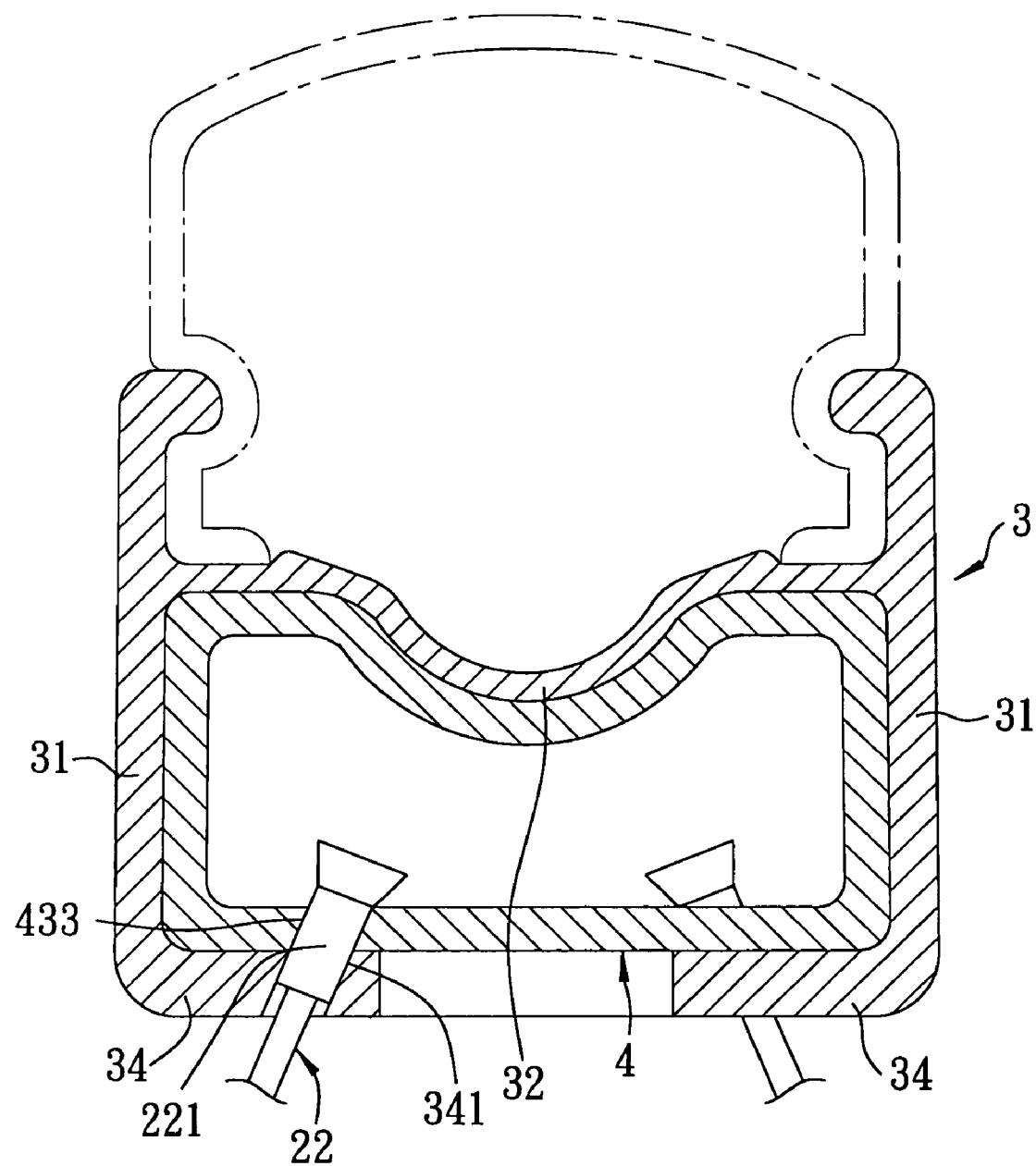
FIG. 11 is a sectional view of the sixth preferred embodiment of a wheel rim according to this invention.

FIG. 11 shows modified left and right confining ribs 34 of the rim body 2, which are wider than those of the previous embodiment. The modified left and right confining ribs 34 are formed with a plurality of holes 341 that are aligned respectively with the first mounting holes 433 of the bottom walls 43 of the anchor members 4 so as to permit extension of the spoke units 22 therethrough.

With this invention thus explained, it is apparent that numerous modifications and variations can be made without departing from the scope and spirit of this invention. It is therefore intended that this invention be limited only as indicated by the appended claims.

I claim:

1. A wheel rim adapted for connection with a tire and a plurality of spoke units, said wheel rim comprising:

a rim body including a pair of annular left and right side walls each having a radial inner end, an annular connecting wall interconnecting and disposed between said left and right side walls, and a pair of annular left and right confining ribs extending respectively from said radial inner ends of said left and right side walls toward each other to define a mounting space among said left and right side walls, said connecting wall, and said confining ribs, said confining ribs defining cooperatively an opening that is formed therebetween and that is communicated with said mounting space; and a plurality of anchor members disposed fixedly within said mounting space in said rim body, each of said anchor members having a bottom wall that abuts against said confining ribs and that has a first mounting hole which is adapted to permit extension of a respective one of the spoke units therethrough.

2. The wheel rim as claimed in claim 1, wherein said first mounting holes in said bottom walls of said anchor members are exposed within said opening in said rim body.

3. The wheel rim as claimed in claim 1, wherein said bottom wall of each of said anchor members has a pair of thick left and right side wall portions, and a thin middle wall portion interconnecting and being disposed between said thick left and right side wall portions and being thinner than said thick left and right side wall portions, each of said first mounting holes being formed through one of said thick left and right side wall portions of a corresponding one of said anchor members.

4. The wheel rim as claimed in claim 3, wherein said bottom wall of each of said anchor members further has a second mounting hole, said first and second mounting holes in said bottom wall of each of said anchor members being formed respectively through said thick left and right side wall portions of said bottom wall of a corresponding one of said anchor members.

5. The wheel rim as claimed in claim 4, wherein said first and second mounting holes in said bottom walls of said anchor members are exposed within said opening in said rim body.

6. The wheel rim as claimed in claim 1, wherein each of said anchor members has a top wall abutting against said connecting wall of said rim body, each of said connecting wall of said rim body and said top walls of said anchor members having a radially and inwardly concaved middle portion.

7. The wheel rim as claimed in claim 1, wherein each of said left and right side walls of said rim body further has a radial outer end, said radial outer ends of said left and right side walls cooperating with said connecting wall of said rim body so as to be adapted to support the tire.

8. The wheel rim as claimed in claim 1, wherein said bottom wall of each of said anchor members has a pair of thin left and right side wall portions, and a thick middle wall portion interconnecting and being disposed between said thin left and right side wall portions and being thicker than said thick left and right side wall portions, said first mounting holes being formed respectively through said thick middle wall portions of said bottom walls of said anchor members.

9. The wheel rim as claimed in claim 8, wherein said bottom wall of each of said anchor members further has a second mounting hole that is formed through said thick middle wall portion of said bottom wall of a corresponding one of said anchor members, said first and second mounting holes in said bottom wall of said anchor members being disposed in a plane.

10. The wheel rim as claimed in claim 1, wherein said left and right confining ribs of said rim body are formed with a plurality of holes that are aligned respectively with said first mounting holes in said bottom walls of said anchor members and that are adapted to permit the spoke units to extend respectively therethrough.

* * * * *